United States Patent [19]

Tsai et al.

[11] Patent Number: 5,003,035

[45] Date of Patent: Mar. 26, 1991

[54] CROSSLINKABLE RIGID-ROD BENZOBISAZOLE COPOLYMER

[75] Inventors: Tsu-Tzu Tsai, Dayton; Fred E. Arnold, Centerville, both of Ohio

[73] Assignee: The United States of America as represented by the Secretary of the Air Force, Washington, D.C.

[21] Appl. No.: 379,038

[22] Filed: Jul. 13, 1989

[51] Int. Cl.$^5$ ............................................. C08G 75/32
[52] U.S. Cl. ..................................... 528/337; 528/183;
528/186; 528/339; 528/342; 528/348; 528/349
[58] Field of Search ............... 528/337, 348, 349, 342, 528/339

[56] References Cited

U.S. PATENT DOCUMENTS

| | | | |
|---|---|---|---|
| 4,108,835 | 8/1978 | Arnold et al. | 528/183 |
| 4,207,407 | 6/1980 | Helminiak et al. | 525/425 |
| 4,225,700 | 9/1980 | Wolfe et al. | 528/337 |
| 4,377,546 | 3/1983 | Helminiak et al. | 264/232 |
| 4,533,692 | 8/1985 | Wolfe et al. | 524/417 |
| 4,533,693 | 8/1985 | Wolfe et al. | 524/417 |
| 4,554,119 | 11/1985 | Chenevey | 264/85 |
| 4,606,875 | 8/1986 | Chenevey et al. | 264/85 |
| 4,608,427 | 8/1986 | Sweeny et al. | 528/179 |

OTHER PUBLICATIONS

Tsai, T. T. et al, "Benzobisazole Rigid-Rod Polymers with Pendent Methyl Groups", Polymer Preprints, vol. 29, No. 2, pp. 324–325, 1988.

Chuah, H. H. et al, "Crosslinked Benzobisthiazole Rigid-Rod Copolymers Via Labile Methyl Groups", Plastic and Coatings Pmr Sci Proc., Apr. 1989.

*Primary Examiner*—Harold D. Anderson
*Attorney, Agent, or Firm*—Charles E. Bricker; Donald J. Singer

[57] ABSTRACT

There are provided para-ordered aromatic heterocyclic copolymers having repeating groups of the following formulas:

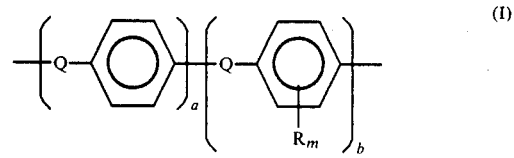

and

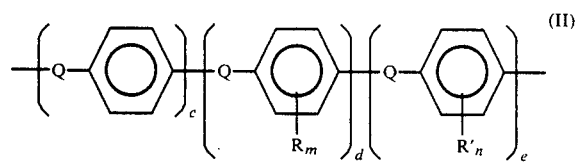

wherein a, b, c, d, and e are positive integers, each representing an average number of the respective different recurring units present in the repeating group, m and n are 1 or 2, R and R' are alkyl groups having 1 to 4 carbon atoms, and Q is a benzobisazole group of the formula:

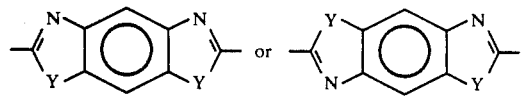

wherein Y is —O—, —S—, or —NH—. In the copolymers wherein m or n is 2, the R or R' groups can be the same or different. In copolymer I, the ratio a:b can be about 1:1 to 99:1. In copolymer II, the ratio c:(d+e) can be about 1:1 to 99:1, and the ratio d:e can be aobut 1:99 to 99:1.

14 Claims, No Drawings

CROSSLINKABLE RIGID-ROD BENZOBISAZOLE COPOLYMER

RIGHTS OF THE GOVERNMENT

The invention described herein may be manufactured and used by or for the Government of the United States for all governmental purposes without the payment of any royalty.

BACKGROUND OF THE INVENTION

This invention relates to crosslinkable, para-ordered aromatic heterocyclic copolymers.

In general, the class of aromatic heterocyclic extended chain copolymers are well known for their outstanding thermal, physical and chemical properties. These copolymers generally exhibit excellent modulus and tenacity properties, but lack good properties when in compression, which limits their use as reinforcing structural fibers.

In Tsai et al, U.S. Pat. No. 4,835,246, dated May 30, 1989, we disclose para-ordered aromatic heterocyclic polymers having pendant benzazole groups. These polymers exhibit improved compressive properties. Further research into para-ordered aromatic heterocyclic polymers has provided copolymers which are crosslinkable without degradation of the main copolymer backbone.

It is an object of the present invention to provide novel crosslinkable rigid-rod aromatic heterocyclic copolymers.

Other objects, aspects and advantages of the present invention will be apparent to those skilled in the art from a reading of the following detailed disclosure of the invention.

SUMMARY OF THE INVENTION

In accordance with the present invention, there are provided para-ordered aromatic heterocyclic copolymers having repeating groups of the following formulas:

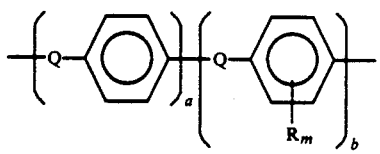

(I)

and

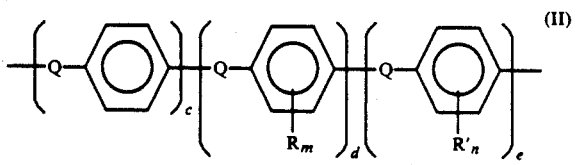

(II)

wherein a, b, c, d, and e are positive integers, each representing an average number of the respective different recurring units present in the repeating group, m and n are 1 or 2, R and R' are alkyl groups having 1 to 4 carbon atoms, and Q is a benzobisazole group of the formula:

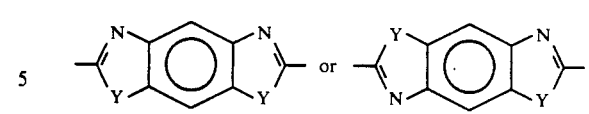

wherein Y is —O—, —S—, or —NH—. In the copolymers wherein m or n is 2, the R or R' groups can be the same or different. In copolymer I, the ratio a:b can be about 1:1 to 99:1. In copolymer II, the ratio c:(d+e) can be about 1:1 to 99:1, and the ratio d:e can be about 1:99 to 99:1.

DESCRIPTION OF THE PREFERRED EMBODIMENTS

The copolymers of the present invention are prepared by reacting an amine monomer having the structure

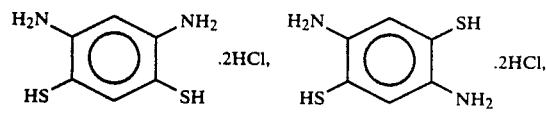

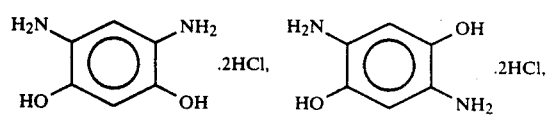

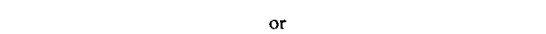

or

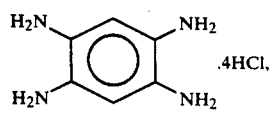

with terephthalic acid and one or more mono- or di-alkyl-substituted terephthalic acid(s). A terephthalyl halide or terephthalonitrile may be employed in place of the terephthalic acid or the mon- or di-alkyl-substituted terephthalic acid.

The pendant alkyl terephthalic acid monomers may be prepared as follows:

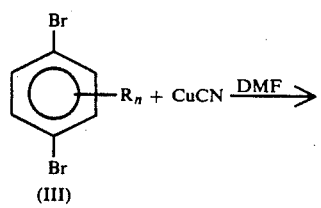

(III)

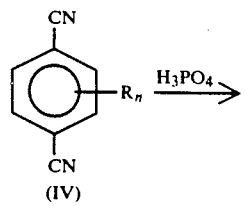

(IV)

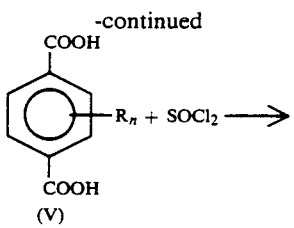

In the reactions given above, R and n are as previously defined.

Conversion of the mono- or di-alkyl-p-dihalo benzene to the corresponding pendant alkyl p-dinitrile, with subsequent conversion to the carboxylic acid or acid halide is known in the art.

The copolymers may be prepared by:

a. mixing an amino monomer, as described above, with or without oxidation protecting atoms or groups, e.g., HCl groups, with a preliminary solvent of phosphoric acid having a relatively low phosphorous pentoxide content, about 63 to 83%, preferably below about 80%.

b. heating and optionally placing the resulting mixture under reduced pressure to remove any volatile protecting atoms or groups present and provide a mixture of the amino monomer in the preliminary solvent. This step, as well as subsequent steps, is preferably carried out under an inert gas atmosphere. Suitable inert gases include helium, nitrogen, and argon. Heating the mixture to about 60°–80° C. for about 6 to 24 hours is generally sufficient to remove any volatile products.

c. adding a mixture of the terephthalic acid and alkyl-substituted terephthalic acid or acid salt monomers to the mixture resulting from step b to provide a mixture of amino monomer and acid monomers in the preliminary solvent.

d. increasing the phosphorous pentoxide content of the mixture resulting from step c to provide a reaction medium in which the percentage of phosphorous pentoxide should be about 82 to 86% $P_2O_5$, preferably about 82 to 84% at the end of the copolymerization.

e. causing copolymerization of the monomers at a temperature of about 100 to 20° C. for about 18 to 36 hours. In a presently preferred embodiment, the reaction temperature is increased gradually during the reaction period, e.g., 170° C. for 20 hours, then 190° C. for 4 hours.

The dinitrile and diacid halide monomers tend to sublimate at elevated temperatures; accordingly, it is desireable to maintain the mixture resulting from step d at a relatively lower temperature, e.g., about 90° C. for about 4 to 16 hours to generate oligomers prior to heating the mixture to the higher copolymerization temperatures.

Optionally, steps a, b and c may be combined by adding the amino and terephthalic acid and/or acid salt monomers to the preliminary phosphoric acid solvent, then removing any volatiles, after which the $P_2O_5$ content is raised and the copolymerization is carried out.

At the end of the reaction period, the copolymer may be precipitated from solution by pouring the reaction mixture into water. The copolymer is treated with a weak base, such as ammonium hydroxide, then purified by washing with water and methanol until all phosphoric acid is removed. The copolymer is then dried under reduced pressure.

The copolymer may be further purified by dissolving it in methanesulfonic acid, filtering, inversely precipitating with methanol, stirring with concentrated ammonium hydroxide, and washing with water. The ammonia-free water solution is then filtered and the copolymer washed with methanol and methanol-benzene mixtures, gradually changing to 100 percent benzene. The swollen copolymer is frozen and finally dried under reduced pressure to give a purified copolymer having a high molecular weight.

The copolymer compositions of this invention are optically anisotropic, i.e., microscopic regions of a given extended chain composition are birefringent; a bulk extended chain composition sample depolarizes plane-polarized light because the light transmission properties of the microscopic areas of the extended chain composition vary with direction. This characteristic is associated with the existence of at least part of the extended chain copolymer compositions in the liquid crystalline or mesomorphic state.

The extended chain copolymer compositions of this invention that exhibit optical anisotropy do so while the extended chain copolymer compositions are in the relaxed state. This in contrast to conventional copolymer solutions which may be caused to depolarize plane-polarized light when subjected to appreciable shear.

The copolymers of this invention can be crosslinked by exposure to an elevated temperature or by exposure to suitable radiation. Crosslinking by exposure to heat may be accomplished by exposing the material to a temperature of about 300°–550° C. for about lo to 60 sec. At the higher temperatures, an inert atmosphere of nitrogen, helium or the like, surrounding the material is advised. Radiation crosslinking may be accomplished by exposure of the material to a suitable radiation source, such as gamma radiation, at a radiation level for a time sufficient to provide an irradiation dosage of about 0.1 to 2 GRad.

The copolymers of this invention are soluble in strong acids, such as sulfuric acid and methanesulfonic acid. After crosslinking, they are completely insoluble in all acid solvents.

The liquid crystalline extended chain copolymer compositions are extremely suitable for spinning into highly ordered an high strength fibers by spinning them into suitable baths such as by wet and "air gap" spinning techniques, using spinnerets and other apparatus constructed of materials resistant to the strong acids used. In "air gap" spinning, the spinneret is usually located in air or in an inert gaseous medium a short distance, e.g., 1 to 24 cm, above the surface of a coagulating bath. Techniques for fiber spinning are well known in the art. Such fibers are useful as reinforcement substitutes for other inorganic or organic products.

The copolymers of this invention may also be employed in any use typically performed by engineering thermoplastic materials, such a metal replacements and those areas where high performance is necessary.

Intrinsic viscosity is determined by extrapolation of $\eta(rel) -1/c$ and $\ln \eta(rel)/c$ to zero concentration in methanesulfonicacid at 30° C.

The following examples illustrate the invention:

EXAMPLE I

Copoly((benzo(1,2-d:4,5-d')bisthiazole-2,6-diyl))-(p-phenylene)$_{50\%}$/(2-methyl-p-phenylene)$_{50\%}$)

Into the bottom of a resin flask equipped with a high torque mechanical stirrer, nitrogen inlet/outlet, pressure regulator and a side opening for additions, was placed 3.3823 g (14 mmol) of 2,5-diamino-1,4-benzenedithiol dihydrochloride, 1.1460 g (7 mmol) of terephthalic acid, 0.9806 g (7 mmol) of 2,5-biscyanotoluene and 19.5 g of polyphosphoric acid (PPA) (77% $P_2O_5$). The monomers were incorporated into the PPA by stirring, and the resulting mixture was then dehydrochlorinated under reduced pressure (176 mm) by heating as follows: 45° C./18h; 78° C./8h; 80° C./16h; and 90° C./4h. The reaction mixture was cooled to 50° C. and 8.10 g of $P_2O_5$ was added, thereby raising the final copolymer concentration to 12%. Under a positive nitrogen flow, the mixture was heated at 170° C. for 20h then at 190° C. for 4h. As the temperature was increased, opalescence began to appear at about 160° C. The copolymer was precipitated into water, collected by suction filtration, washed with ammonium hydroxide, water, and methanol and then dried under reduced pressure (0.02mm) at 110° C. An intrinsic viscosity of 31 dl/g was obtained in methanesulfonic acid.

Calcd for $C_{29}H_{14}S_4N_4$: C, 63.69: H, 2.57; N, 10.02; S, 23.44.

Found: C, 61.35: H, 2.54; N, 10.31; S, 22.17.

EXAMPLE II

Copoly((benzo(1,2-d:4,5-d')bisthiazole-2,6-diyl))-(p-phenylene)$_{90\%}$/(2-methyl-p-phenylene)$_{10\%}$)

Into the bottom of a resin flask equipped with a high torque mechanical stirrer, nitrogen inlet/outlet, pressure regulator and a side opening for additions, was placed 5.0394 g (21 mmol) of 2,5-diamino-1,4-benzenedithiol dihydrochloride, 3.0729 g (18 mmol) of terephthalic acid, 0.2922 g (2 mmol) of 2,5-biscyanotoluene and 18.3 g of PPA (77% $P_2O_5$). The monomers were incorporated into the PPA by stirring, and the resulting mixture was then dehydrochlorinated under reduced pressure (176 mm) by heating as follows: 45° C./18h; 78° C./8h; 80° C./16h; and 90° C./ 4h. The reaction mixture was cooled to 50° C. and 19.4 g of $P_2O_5$ was added, thereby raising the final copolymer concentration to 12%. Under a positive nitrogen flow, the mixture was heated at 170° C. for 20h then at 190° C. for 4h. As the temperature was increased, opalescence began to appear at about 160° C. The copolymer was precipitated into water, collected by suction filtration, washed with ammonium hydroxide, water, and methanol and then dried under reduced pressure (0.02mm) at 110° C. An intrinsic viscosity of 32 dl/g was obtained in methanesulfonic acid.

Calcd for $C_{14.1}H_{6.2}S_2N_2$:C, 63.25: H, 2.33; N, 9.15; S, 23.94.

Found: C, 61.75: H, 2.51; N, 10.61; S, 22.79.

EXAMPLE III

Copoly((benzo(1,2-d:4,5-d')bisthiazole-2,6-diyl))-(p-phenylene)$_{98\%}$/(2-methyl-p-phenylene)$_{2\%}$)

Into the bottom of a resin flask equipped with a high torque mechanical stirrer, nitrogen inlet/outlet, pressure regulator and a side opening for additions, was placed 10.4616 g (43 mmol) of 2,5-diamino 1,4-benzenedithiol dihydrochloride, 6.9464 g (42 mmol) of terephthalic acid, 0.1213 g (1 mmol) of 2,5-biscyanotoluene and 48.5 g of PPA (77% $P_2O_5$). The monomers were incorporated into the PPA by stirring, and the resulting mixture was then dehydrochlorinated under reduced pressure (176 mm) by heating as follows: 45° C./18h; 78° C./8h; and 90° C./ 4h. The reaction mixture was cooled to 50° C. and 32.0 g of $P_2O_5$ was added, thereby raising the final copolymer concentration to 12%. Under a positive nitrogen flow, the mixture was heated at 170° C. for 20h then at 190° C. for 4h. As the temperature was increased, opalescence began to appear at about 160° C. The copolymer was precipitated into water, collected by suction filtration, washed with ammonium hydroxide, water, and methanol and then dried under reduced pressure (0.02mm) at 140° C. for 24 h. An intrinsic viscosity of 29.5 dl/g was obtained in methanesulfonic acid.

Calcd for $C_{14.02}H_{6.04}S_2N_2$: C, 63.15: H, 2.28; N, 10.05; S, 24.06.

Found: C, 61.52: H, 2.49; N, 11.10; S, 23.00.

EXAMPLE IV

Poly(benzo(1,2-d:4,5-d')bisthiazole-2,6-diyl(2-methyl-p-phenylene))

This polymer does not form a part of the present invention. It is included here for comparison.

Into the bottom of a resin flask equipped with a high torque mechanical stirrer, nitrogen inlet/outlet, pressure regulator and a side opening for additions, was placed 2.6793 g (11 mmol) of 2,5-diamino-1,4-benzenedithiol dihydrochloride, 1,5533 g (11 mmol) of 2,5-biscyanotoluene and 20.40 g of PPA (77% $P_2O_5$). The monomers were incorporated into the PPA by stirring, and the resulting mixture wa then dehydrochlorinated under reduced pressure (176 mm) by heating as follows: 45° C./18h; 78° C./8h; 80° C./16h. The reaction mixture was cooled to 50° C. and 5.34 g of $P_2O_5$ was added, thereby raising the final polymer concentration to 13%. Under a positive nitrogen flow, the mixture was heated at 90° C. for 16h, at 170° C. for 24h and at 190° C. for 6h. As the temperature was increased, opalescence began to appear at about 160° C. The polymer was precipitated into water, collected by suction filtration, washed with ammonium hydroxide, water, and methanol and then dried under reduced pressure (0.02mm) at 110° C. An intrinsic viscosity of 23.0 dl/g was obtained in methanesulfonic acid.

Calcd for $C_{15}H_8S_2N_2$: C, 64.26: H, 2.87; N, 9.99; S, 22.80.

Found: C, 64.61: H, 3.06; N, 9.96; S, 22.08.

EXAMPLE V

Poly(benzo(1,2-d:4,5-d')bisthiazole-2,6-diyl(2,5-dimethyl-p-phenylene))

This polymer does not form a part of the present invention. It is included here for comparison.

Into the bottom of a resin flask equipped with a high torque mechanical stirrer, nitrogen inlet/outlet, pressure regulator and a side opening for additions, was placed 4.835 g (20 mmol) of 2,5-diamino-1,4-benzenedithiol dihydrochloride and 35.50 g of PPA (77% $P_2O_5$). The monomer was incorporated into the PPA by stirring, and the resulting mixture was then dehydrochlorinated under reduced pressure (176 mm) by heating as follows: 45° C./18h; 78° C./8h; 80° C./16h; and 90° C./4h At the end of this heating, a clear solution was obtained indicating the completion of dehydrochlorination. The reaction mixture was cooled to 50° C. and 4.5604 g (20 mmol) of 2,5-dimethyl terephthalyl chloride and 16.0 g of P₂O₅ were added, with continuous stirring, thereby raising the final copolymer concentration to 10%. Under a positive nitrogen flow, the mixture was heated at 80° C. for 16h, at 150° C. for 20h and at 190° C. for 4h. The copolymer was precipitated into water, collected by suction filtration, washed with ammonium hydroxide, water, and methanol and then dried under reduced pressure (0.02mm) at 110° C. An intrinsic viscosity of 30.8 dl/g was obtained in methanesulfonic acid.

Calcd for $C_{14}H_{10}S_2N_2$: C, 65.28: H, 3.42; N, 9.51; S, 21.78.

Found: C. 64.77: H, 3.41; N, 9.38; S, 20.37.

EXAMPLE VI

Mechanical Properties, Solubility and Crosslinking

For comparison, the intrinsic viscosities of the polymers and copolymers prepared in Examples I - V are shown in Table I, below. For convenience, the structure of copolymer I is shown:

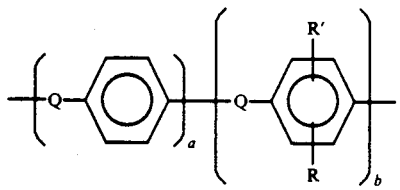

TABLE I

| | Polymer Mole % | | | | | |
|---|---|---|---|---|---|---|
| Ex. | a | b | R | R¹ | Conc. | η |
| I | 50 | 50 | CH₃ | H | 12 | 31 |
| II | 90 | 10 | CH₃ | H | 12 | 32 |
| III | 98 | 2 | CH₃ | H | 12 | 29 |
| IV | 0 | 100 | CH₃ | H | 13 | 23 |
| V | 0 | 100 | CH₃ | CH₃ | 10 | 31 |

In the table above, the term Conc. means the weight percent concentration of polymer in the polymerization media (PPA). The intrinsic viscosities (η) were measured in methanesulfonic acid (MSA) at 30° C.

The copolymers prepared according to Examples I–V were spun from the PPA dope into monofilament fibers using a dry-jet wet spinning method with a 10 mil. diameter spinnerette and coagulaged in distilled water. The bulk viscosity and processing conditions for each dope are shown in Table II, below. The air gap where the fiber was stretched was maintained at 8 in. After neutralization with 3% NH₄OH solution and washing with water, the fibers were tension dried at 150° C. and heat treated in a tube oven with 30 sec. residence time under nitrogen, except as noted.

Tensile properties were measured using an Instron tensile tester with 1, 3 and 5 ft. gauge length for the correction of machine compliance. Compressive strength was measured on single-filament fiber at 1 ft. gauge length using the recoil method.

TABLE II

| | | | Processing Conditions, Mechanical Properties and Solubility | | | | |
|---|---|---|---|---|---|---|---|
| | | HT | Physical Properties | | | | Solubility |
| Ex. | SDR | °C. | Mod (msi) | TS (ksi) | E_b (%) | CS (ksi) | in MSA |
| I | 8 | 500 | 33 | 290 ± 12 | 1.0 ± 0.1 | 25–46 | Swelled |
| | 8 | 500* | 38 | 341 ± 33 | 1.0 ± 0.1 | 12–25 | Swelled |
| | 30 | 500 | 41 | 465 ± 24 | 1.3 ± 0.1 | 19–30 | Swelled |
| | 30 | 500* | 43 | 404 ± 30 | 1.2 ± 0.1 | 12–30 | Swelled |
| II | 18 | 500 | 28 | 240 ± 32 | 1.8 ± 0.6 | 66–75 | Swelled |
| III | 20 | 500 | 31 ± 4 | 350 ± 43 | 1.5 ± 0.3 | 37–43 | Swelled |
| IV | 8 | 500 | 32 ± 2 | 270 ± 26 | 1.7 ± 0.2 | 47–53 | Swelled |
| | 51 | 500 | 31 ± 2 | 344 ± 30 | 1.7 ± 0.2 | 20–30 | Swelled |
| V | 19 | 350 | 17 | 306 ± 43 | 2.8 ± 0.3 | — | |
| | — | 275 | — | — | — | — | Soluble |

*heat treated in air atmosphere

Various modifications may be made to the invention as described without departing from the spirit of the invention or the scope of the appended claims.

We claim:

1. A para-ordered aromatic heterocyclic copolymer having repeating groups of the formula:

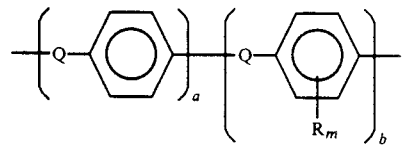

wherein a and b are positive integers, each representing an average number of the respective different recurring units present in said repeating group, m is 1 or 2, R is an alkyl group having 1 to 4 carbon atoms, and Q is a benzobisazole group of the formula:

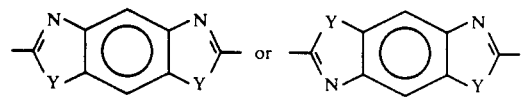

wherein Y is —S—.

2. The copolymer of claim 1 wherein the ratio of a:b is about 1:1 to 99:1.

3. The copolymer of claim 1 wherein m is 1.

4. The copolymer of claim 3 wherein R is —CH₃.

5. The copolymer of claim 4 wherein the ratio of a:b is about 1:1.

6. The copolymer of claim 4 wherein the ratio of a:b is about 9:1.

7. The copolymer of claim 4 wherein the ratio of a:b is about 49:1.

8. The copolymer of claim 1 wherein m is 2.

9. A para-ordered aromatic heterocyclic copolymer having repeating groups of the formula:

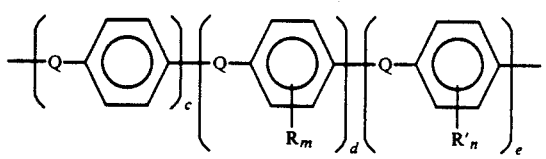

wherein c, d, and e are positive integers, each representing an average number of the respective different recurring units present in said repeating group, m and n are 1 or 2, R and R' are alkyl groups having 1 to 4 carbon atoms, and Q is a benzobisazole group of the formula:

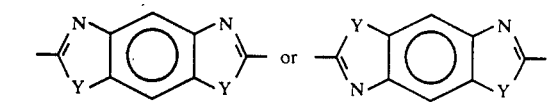

wherein Y is —S—.

10. The copolymer of claim 9 wherein the ratio of c:(d+e) is about 1:1 to 99:1 and the ratio of d:e is about 1:99 to 99:1.

11. The copolymer of claim 9 wherein m is 1 and n is 1.

12. The copolymer of claim 9 wherein m is 1 and n is 2.

13. The copolymer of claim 9 wherein m is 2 and n is 1.

14. The copolymer of claim 9 wherein m is 2 and n is 2.

* * * * *